United States Patent
Walker et al.

(10) Patent No.: US 6,320,918 B1
(45) Date of Patent: *Nov. 20, 2001

(54) PROCEDURE FOR REDUCING INTERFERENCE IN THE TRANSMISSION OF AN ELECTRICAL COMMUNICATION SIGNAL

(75) Inventors: Michael Walker, Baltmannsweiler; Hans Jürgen Matt, Remseck; Michael Trompf, Heimsheim, all of (DE)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,830

(22) Filed: Aug. 13, 1998

(30) Foreign Application Priority Data

Aug. 22, 1997 (DE) .............................. 197 36 517

(51) Int. Cl.[7] .................. H03D 1/04; H03D 1/06; H03K 5/01; H03K 6/04; H04B 1/10
(52) U.S. Cl. ............... 375/346; 375/285; 375/340; 455/63
(58) Field of Search .................. 375/285, 254, 375/296, 346, 348, 377, 224, 227, 325, 340; 455/226.1, 222, 67.3, 63, 501, 278.1, 296; 329/318, 320, 349, 353; 332/107, 123, 159; 333/12

(56) References Cited

U.S. PATENT DOCUMENTS

| | | | |
|---|---|---|---|
| 4,290,090 | * | 9/1981 | Yamamoto et al. |
| 4,704,736 | * | 11/1987 | Kasser .................. 455/213 |
| 5,265,121 | * | 11/1993 | Stewart . |
| 5,544,277 | * | 8/1996 | Bakis et al. . |
| 6,006,173 | * | 12/1999 | Wiese et al. ........... 704/201 |
| 6,118,805 | * | 9/2000 | Bergstrom et al. .... 375/130 |
| 6,122,309 | * | 9/2000 | Bergstrom et al. .... 375/130 |
| 6,131,031 | * | 10/2000 | Bergstrom et al. ...... 455/63 |

FOREIGN PATENT DOCUMENTS

| | | |
|---|---|---|
| 3415648 | 1/1988 | (DE) . |
| 4427351 | 3/1996 | (DE) . |
| 61-1722 | 8/1986 | (JP) . |
| 2175160 | 7/1990 | (JP) . |
| 7-95537 | 4/1995 | (JP) . |

OTHER PUBLICATIONS

"Adaptive Systems for the Reduction of Environmental Noise in Voice Transmissions" W. Reich, Dissertation at the Institute for Communication Technology, University of Karlsruhe Feb. 1985, pp. 12–27.

"Parallel Distributed Processing" D. Rumelhart et al., vol. 1: Foundations, MIT Press, 1986.

"Self–Organization and Associative Memory" T. Kohonen Springer Series in Information Sciences, 3rd Edition, pp. 119–155.

* cited by examiner

*Primary Examiner*—Jean Corrielus

(57) ABSTRACT

Through crosstalk on lines, interference from current transmission lines or line echoes, the useable signal is superimposed by different interference signals. The task is to find a procedure for reducing interference which, compared to the current state of the art, can be achieved with a smaller amount of computing input and is suited to both the reduction of quasi steady-state and non-steady interference. In this, the interference of a received signal is classified with regards to characteristics in the time range as a click, crackle, rumble or noise interference signal. The time range in which the interference occurs is marked. Depending on the interference type, interference blanking and/or an interpolation of the useable signal and/or a subtraction of the interference signal from the useable signal and/or a regeneration of the useable signal is carried out.

9 Claims, 7 Drawing Sheets

PROCEDURE FOR REDUCING INTERFERENCE IN THE TRANSMISSION OF AN ELECTRICAL COMMUNICATION SIGNAL

BACKGROUND OF THE INVENTION

1. Technical Field

The invention refers to a procedure for reducing interference in the transmission of an electrical communication signal which preferably is a voice signal but which could also be a data signal. In the transmission of voice signals over faulty channels, the voice signals are generally superimposed with additional interference. This interference can have different causes, for example crosstalk on lines, interference from power transmission lines, bit errors or burst errors in the case of digital transmission routes or echoes on the lines. The faulty signals caused by this interference can take on such great amplitudes that the audibility of the voice on the received voice signal is decreased significantly.

2. Discussion of Related Art

To reduce the faulty parts of a voice signal which has been received with interference, it is generally well known that band-stop filters can be used which suppress the interference in a particular frequency range. In this, the disadvantage is that parts of the frequency of the voice signal are also suppressed.

If the faulty signal can be established over a great amplitude which exceeds a certain threshold, for example in the HF or ZF demodulator range of the receiver, then the output signal can be switched to silent. Such a procedure is used, for example, in UKW radio receivers and amateur devices.

In addition, it is known in the case of a statistically steady-state noise how to estimate and buffer the noise in the voice breaks and to subtract the noise spectrum from this noise during speech, as in W. Reich: Adaptive systems for the reduction of environmental noise in voice transmissions, Dissertation at the Institute for Communication Technology, the University of Karlsruhe, 1985. In the described procedure, the time function of the voice is transformed by means of a Fast-Fourier transformation into a frequency spectrum; the frequency spectrum is analyzed with regard to unwanted noise and transformed back for further processing in the time range. Due to the multiple Fast-Fourier transformation, this procedure demands great computer input. In addition, disturbance within the voice spectrum cannot be recognized.

SUMMARY OF THE INVENTION

The invention now solves the task of finding a procedure for reducing interference in a communication message which compared to the known state of the art can be achieved with a lower computer input and which is not limited to the reduction of steady-state or quasi-steady state interference but is also suited to the reduction of shorter, non-steady interference.

According to the present invention, a procedure for reducing interference of an electrical communication signal is characterized by the following procedural steps: the communication signal received as a faulty time function is fed to at least one memory as well as at least one detector, the communication signal is stored in the memory and analyzed in the detector with regard to interference signal characteristics, a signal type is recognized by the detector and then the time range is established in which the interference signal occurred, the stored signal is read out from the memory and in the time range of the interference signal a suppression method is selected dependent on the type of interference signal, using which the interference signal and the recognized interference signal type are processed so that an interference-free communication signal is achievable.

The nature of the invention is that the suppression method is selected dependent on the interference signal type. In addition, the interference in a received communication signal are analyzed with regard to characteristics in the time range and classified as clicks, crackles, rumbles or noise interference signals and the time of their occurrence is marked. Dependent on the interference signal type, a blanking out of the interference signal and/or an interpolation of the communication signal and/or a subtraction of the interference signal from the communication signal and/or a regeneration, i.e. the replacement of the interference signal with a usable signal takes place.

BRIEF DESCRIPTION OF THE DRAWINGS

The invention will now be explained using a design example. The diagrams show the following.

DETAILED DESCRIPTION OF PREFERRED EMBODIMENTS

Figure 1:
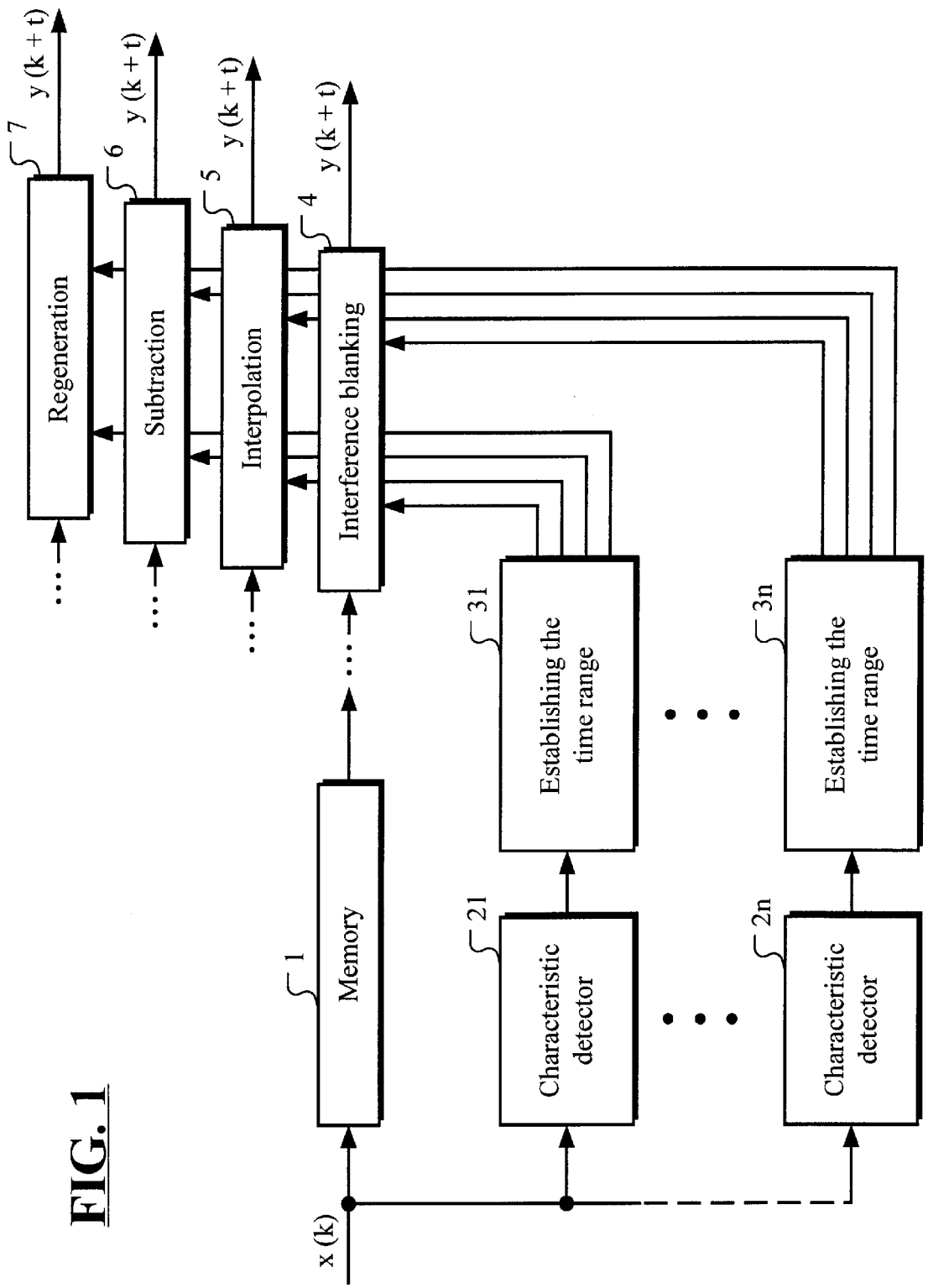
FIG. 1 is a block diagram of a circuit arrangement for describing the invention procedure

According to FIG. 1, the circuit arrangement for carrying out the procedure basically comprises of a memory (1), a group of characteristic detectors 21 . . . 2n, a circuit block 31 . . . 3n allocated to each characteristic detector for establishing the time range as well as modules 4, 5, 6, 7 for the reduction of interference signals, namely for interference blanking 4, interpolation 5, subtraction 6, and regeneration 7.

The received signal x(k) is analyzed in the time range. In addition, it is fed simultaneously to a memory 1 of a defined memory depth τ and a group of characteristic detectors 21 . . . 2n. Using the group of characteristic detectors 21 . . . 2n, an analysis is made of which interference signals typical of the time range, for example based on a correlation measurement, are contained at which amplitude and phase length in the currently received time signal. Typical interference signals are, for example, clicks, crackles and rumbles.

The signal analysis can also be carried out using an artificial neural network which uses sample comparisons based on previously learned noise types to identify the current interference pattern present instead of using correlation measurements. For example, a multilayer perception network is suited for this as described in Rumelhart, McClelland et al: "Parallel Distributing Processing", Volume 1 Foundations, MIT Press, 1986.

Based on the result of the analysis of the received signal x(k), the current time range which with high probability contains one of the detected interference patterns is marked exactly so that the detected interference signal and the faulty received signal x(k) can now be linked with one another according to the interference pattern and this results in a basically interference-free output signal y(k+t).

Figure 2:
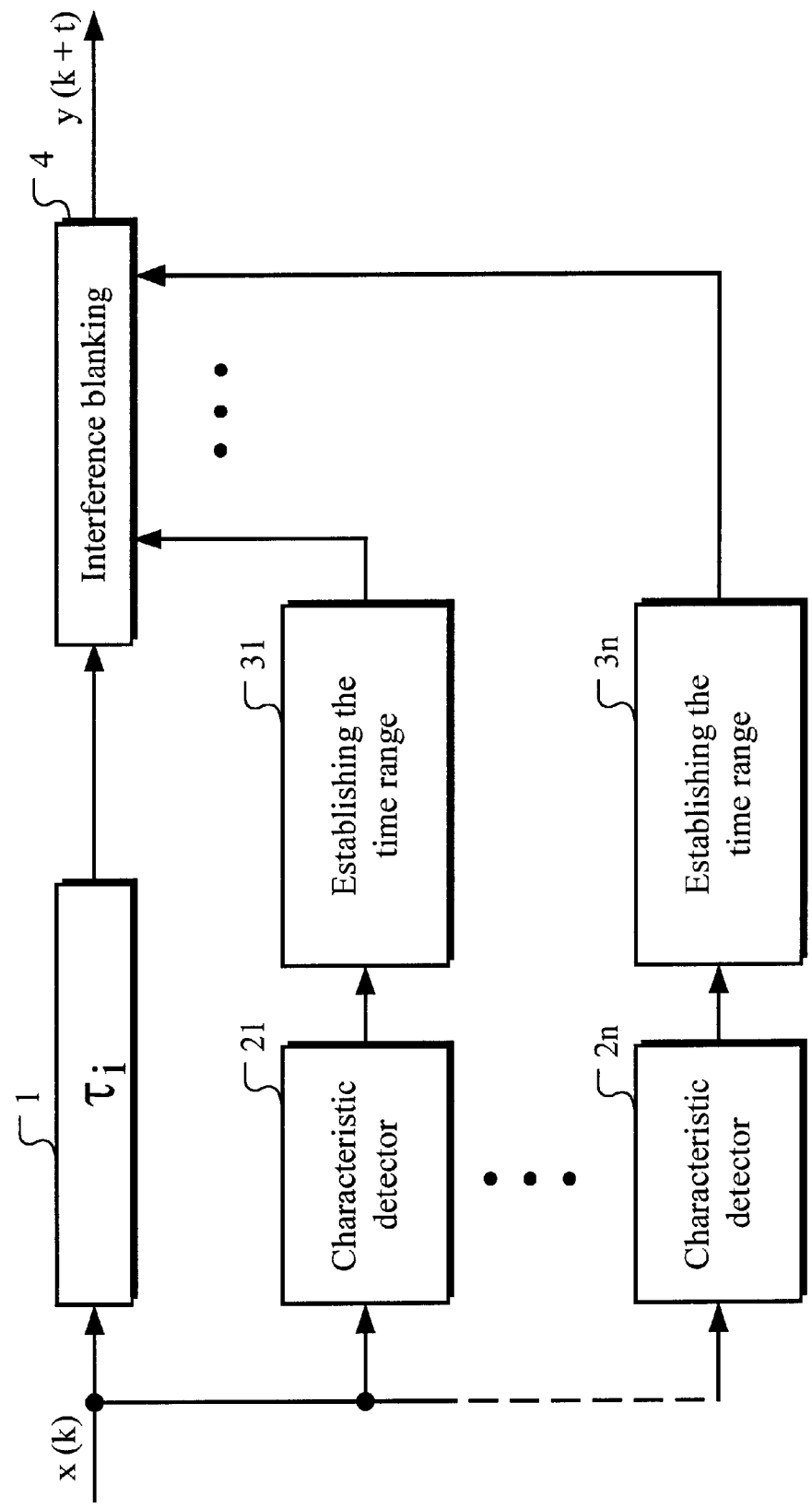
FIG. 2 is a block diagram of a primary design variant of the procedure

FIG. 2 shows the first design variant of the procedure. After the characteristics and time range have been established, the faulty and stored signal x(k) received is read from the memory 1 and the faulty range is replaced by a "zero" signal; the disturbance is cut from the signal. Such interference blanking 4 can be advantageously applied in the case of crackle disturbance in voice transmissions as short interruptions can be covered due to the physiological characteristics of the human ear and thus will not be disruptive.

Figure 3:
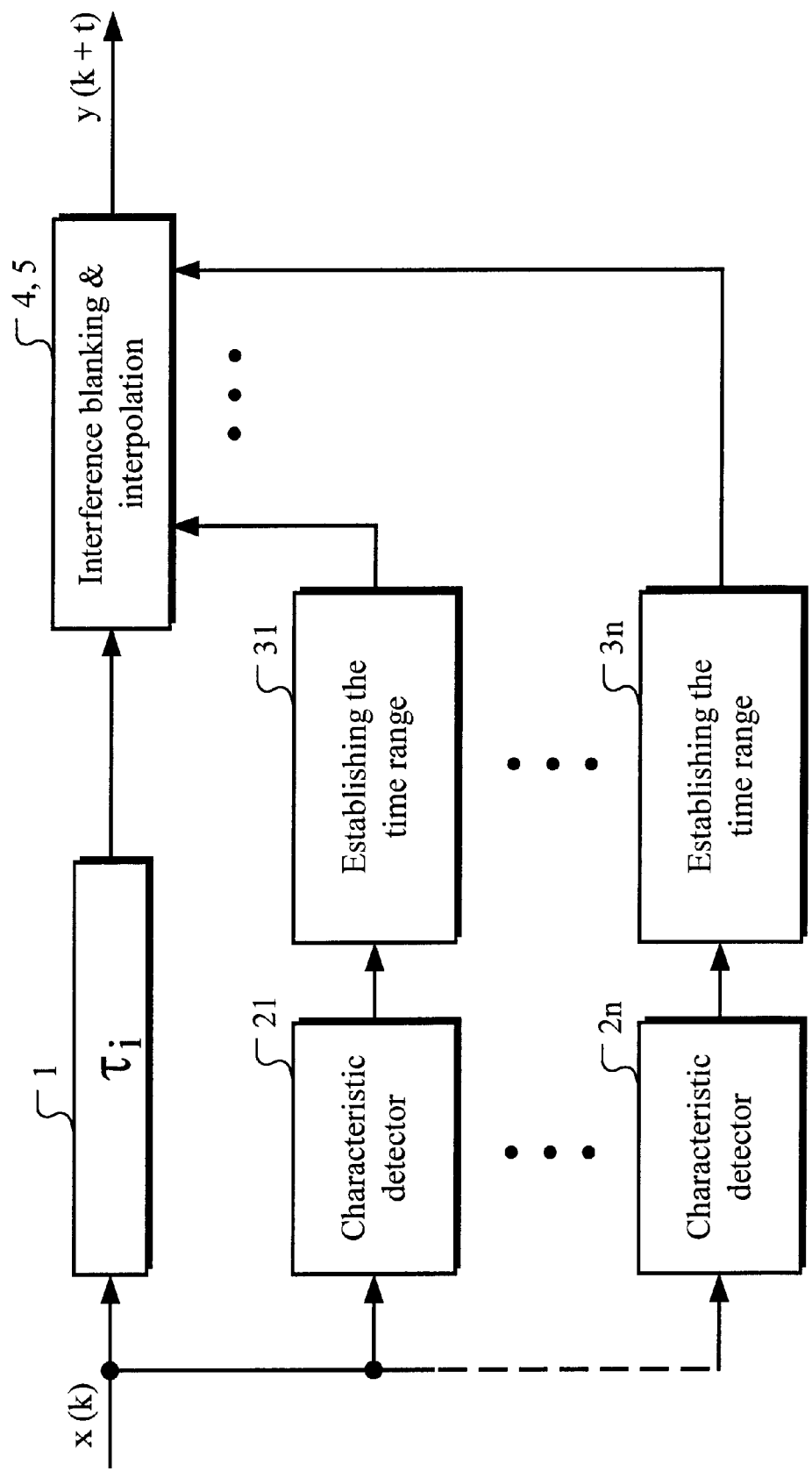
FIG. 3 is a block diagram of a second design variant of the procedure

FIG. 3 shows a second design variant of the procedure. The faulty time range, as described in FIG. 2, is "cut out" of the faulty received signal x(k) and replaced by a linear interpolation between the function values occurring on the time range limits. The interference blanking 4 and interpolation 5 are used if, for example, in the block transmission of a communication signal, interference blanking 4 would immediately trigger an error message. The combination of interference blocking 4 and interpolation 5 can be used particularly effectively even in voice transmissions if the basic frequency of the voice band is used in the interpolation.

Figure 4:
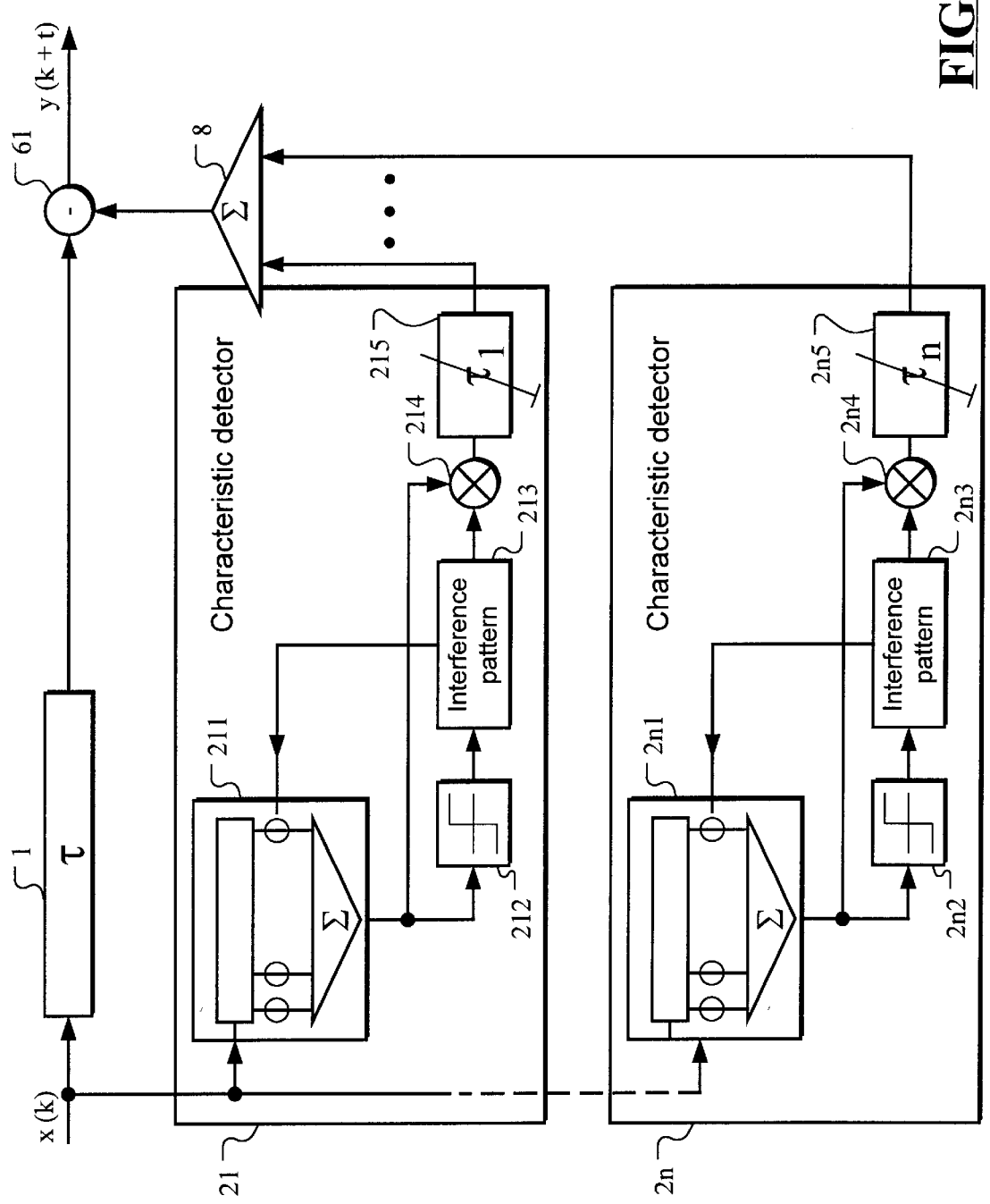
FIG. 4 is a block diagram of a third design variant of the procedure with a circuit arrangement of a characteristic detector

FIG. 4 shows a third design variant of the procedure and a possible way of designing the detectors 21 . . . 2n. A detector 21 basically consists of a FIR filter 211, a trigger 212, an interference pattern generator 213, a multiplier element 214 and a delay element 215. The faulty signal x(k) is fed simultaneously to the memory 1 and the FIR filters 211 . . . 2n1. Each FIR filter 211 . . . 2n1 is set to a particular interference pattern type using the interference pattern generator 213. A correlation result is supplied from FIR filters 211 . . . 2n1 from the received signal x(k) and the interference pattern type. If the interference signal exceeds one of the thresholds defined by the triggers 212 . . . 2n2, then the interference signal is evaluated in the multiplier elements 214 . . . 2n4 using the correlation result, then set in phase using the delay elements 215 . . . 2n5 and fed to a subtraction element 61 over a summing circuit 8. Using the subtraction element 61, any interference with the corresponding amplitude and the correct time and phase angle is subtracted from the faulty received signal x(k) stored in the memory 1.

It is also possible to make a detector 21 . . . 2n as an artificial neural network for the analysis of interference and for the extraction of typical interference characteristics. Artificial neural networks suitable for this are, for example, the so-called Self-Organising Feature Maps, as described by Kohonen T.: Self Organization and Associative Memory, Springer Series in Information Sciences, $3^{rd}$ Edition, pages 119–155.

In addition, it is possible to carry out the identification of existing interference types using pattern comparison with prototypal representatives of different interference types stored in a data base and which come from other processing levels than that of the time range, for example from defined voice coding standards. The typical interference signal parameters are then calculated in advance using suitable signal processing procedures. The prototypal representatives of the interference database for limiting the memory and computer effort required can be obtained using clustering procedures in which, for example, a prototype of a disturbance can be produced from a certain number of interference incidences, so that different instances of an interference type can thus simply be represented by a prototype in the database.

The interference database can advantageously be adapted automatically during operation to interference which occurs, through the content of the database being adapted to the current interference ratios during voice breaks through continual comparison of the pause signal with the prototypes in the interference database. In this way, the adaptation to th e current interference type of the prototypes similar to the current interference type can be made, for example, using averaging procedures, or new entries can be recorded in the interference database, or the prototype adaptation can be combined with new entries.

By exchanging the entries in the interference type database, the suppression procedure can be adapted to particular customer wishes by the manufacturer and configured for different usage environments and device parameters such as band width, dynamics, coding, modulation type and transmission frequency.

Figure 5:
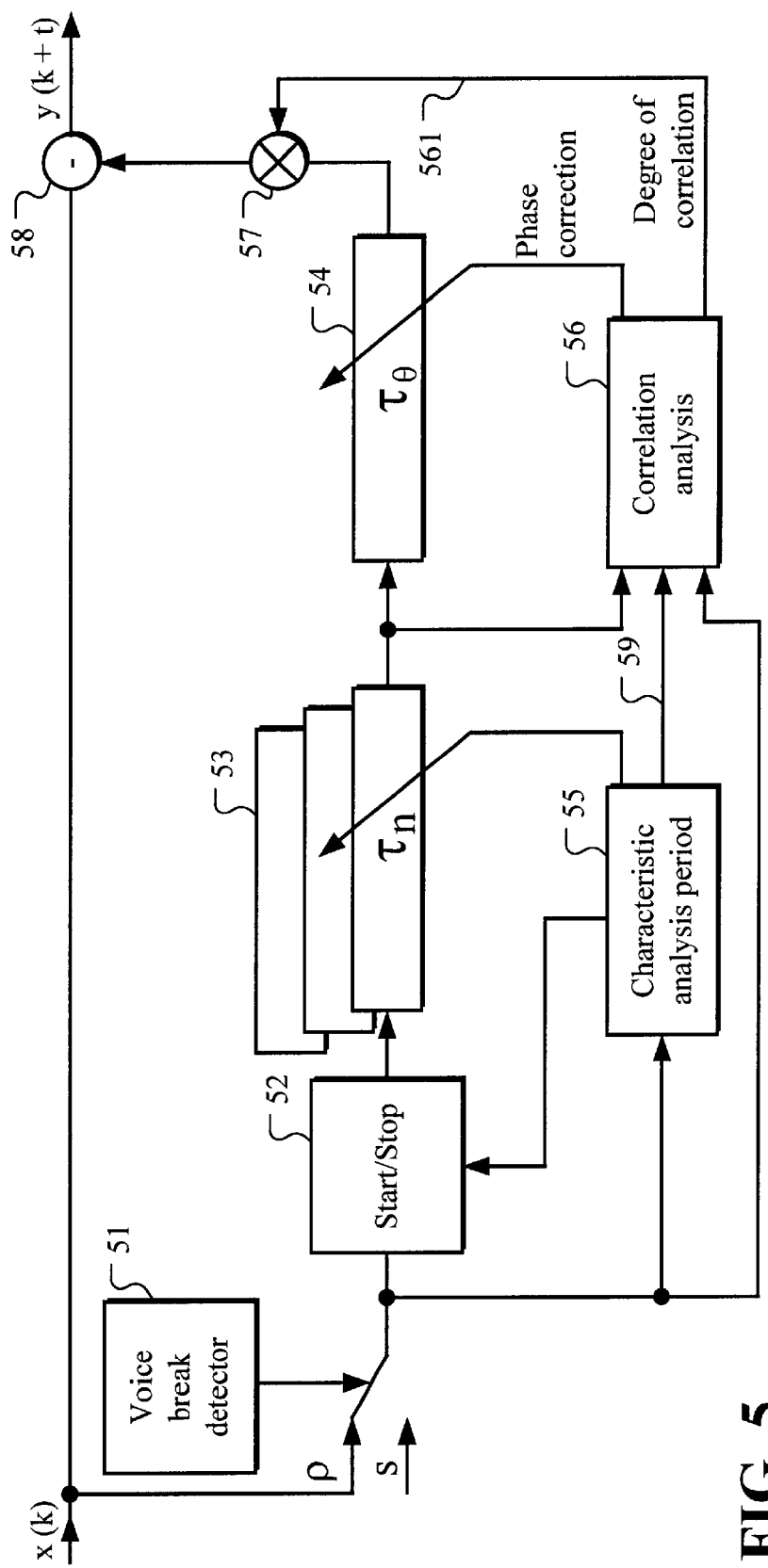
FIG. 5 is a block diagram of a circuit arrangement to carry out the procedure

FIG. 5 shows a block diagram of a circuit configuration of the procedure in reducing steady state disturbance in the voice signal. According to FIG. 5, the circuit configuration basically comprises a voice break detector 51, a start-stop circuit 52, a primary memory 53, a secondary memory 54, a characteristic and period detector 55, a correlation analyser 56, a multiplier element 57 as well as a subtraction element 58.

Steady-state disturbances are defined by the following characteristics:

the distances between the zero crossings of the interference signal repeat periodically the polarity and the value of the interference signal change from period to period.

The aim of the procedure is to determine a steady-state disturbance and to subtract it from the voice signal. To do this, a voice break is first established using the voice break detector 51, in order to be able to carry out a characteristic and period analysis during the voice break using the corresponding detector 55. The disturbances are only recorded in the primary memory 53 until the period of the disturbance is determined and the memory procedure is stopped using the start-stop circuit 52. The characteristic and period detector 55 then releases over a line 59 a time window for the correlation analyser 56 so that a correlation analysis is carried out between the stored and the current disturbance, and the disturbance stored in the primary memory 53 is read out over the secondary memory 54 in phase, evaluated using the correlation degree 561 in the multiplier element 57 and then subtracted from the received voice signal x(k) in the subtraction element 58, so that there is a basically interference-free voice signal y(k+t) at the output of the subtraction element 58.

Figure 6:
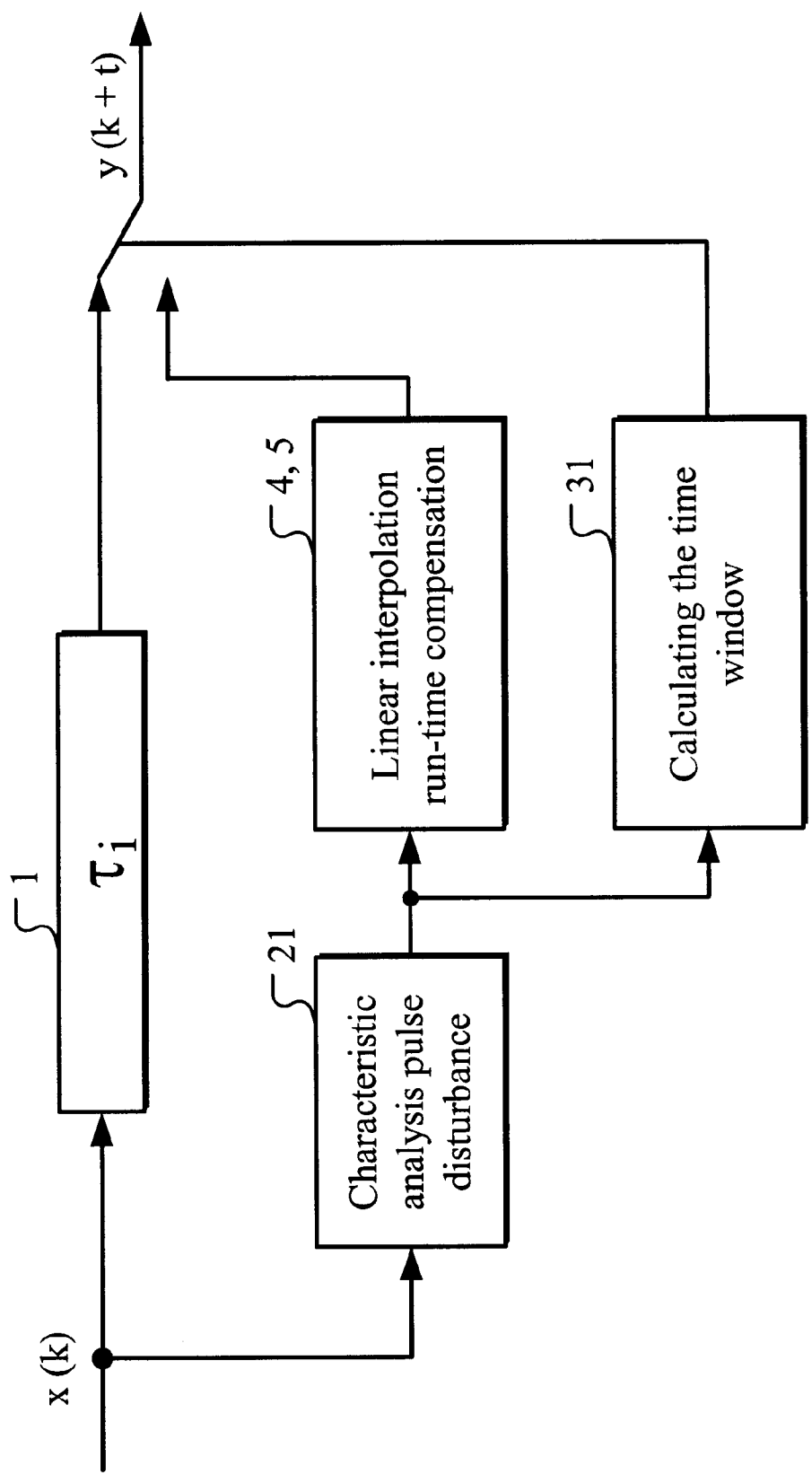
FIG. 6 is a block diagram for the removal of pulse disturbance using linear interpolation

Corresponding to FIG. 3, FIG. 6 shows a block diagram for the reduction of a pulse disturbance using linear interpolation. After establishing the time range 31 of the disturbance, the pulse disturbance is removed using interference blanking 4 and replaced with a linear interpolation 5, so that a basically interference-free voice signal y(k+t) can be produced.

An example for the characteristics of the pulse disturbance:
  duration of the disturbance ts<2ms
  pause time after the interference pulse tp≧ts
  the average value of the faulty voice signal x(k) over a very short time (vsam=very short average magnitude) is greater than the short time average (sam).

vsam {x(k)}>sam{x(k)} the amount of the actual increase $$\left|\frac{dx}{dt}\right|$$

of the faulty voice signal is greater than the increase of the short time average value sam $$\left|\frac{dx}{dt}\right|$$

$$\left|\frac{dx}{dt}\right| > sam \left|\frac{dx}{dt}\right|$$

memory depth of memory 1 τi≧tp+ts

Figure 7:
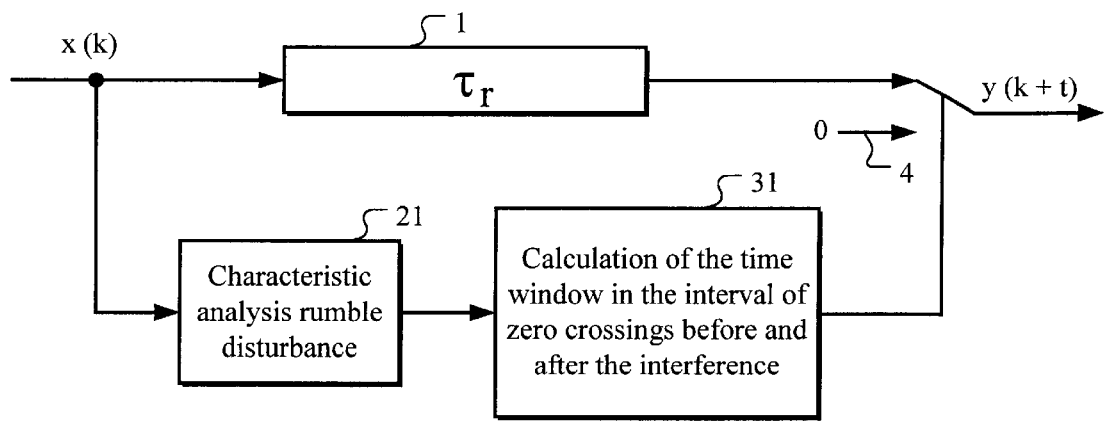
FIG. 7 is a block diagram for the removal of rumble disturbance using interference blanking and FIG. 8 is a block diagram for the removal of disturbance using regeneration.

Corresponding to FIG. 2, FIG. 7 shows a block diagram for the interference blanking of a rumble disturbance. After the characteristic analysis using the characteristic detector 21 and the establishment of the time range 31 in the case of a known rumble disturbance, this is removed from the voice signal x(k) using interference blanking 4.
  Example for the characteristics of the rumble disturbance:
  duration of the disturbance 2 ms<ts <20 ms
  pause time after the interference pulse tp ≧ts
  the short time average value sam of the faulty voice signal x(k) is greater than the long time average value (lam).

sam {x(k)}>lam {x(k)} the amount of the actual increase $$\left|\frac{dx}{dt}\right|$$

of the faulty voice signal is greater than the increase of the short time average value sam $$\left|\frac{dx}{dt}\right|$$

$$\left|\frac{dx}{dt}\right| > sam \left|\frac{dx}{dt}\right|$$

memory depth of memory 1 τ_r≧tp +ts

Figure 8:
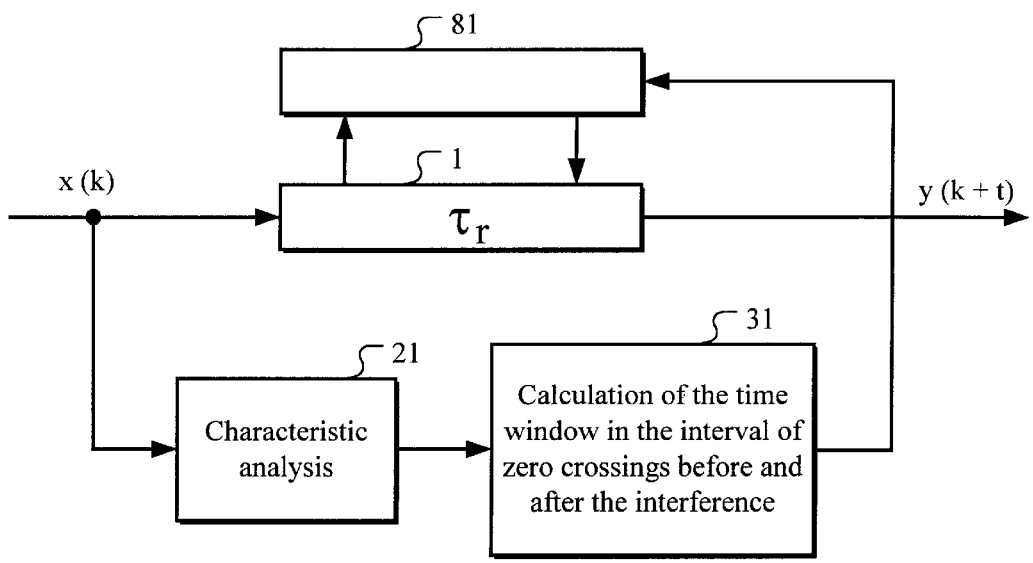

FIG. 8 shows a possible way of replacing the recognized interference signal with a usable signal. To do this, after the characteristic analysis using the characteristic detector 21 and the establishment of the time window of the interference signal 31, the period of the usable signal x(k) is established using a period detector 81 so that after a known period, the interference signal can be blanked and replaced using the corresponding usable signal.

Using the invention procedure, there is an important effective reduction in computer time in handling both steady-state and non-steady interference compared to spectral subtraction in the time range. It is advantageous that the suppression methods can be selected dependent on the characteristics of the interference signal and combined if required. Thus the invention can be used advantageously anywhere where strong background noise occurs, such as in operating all types of telephone terminals in different environmental conditions, such as at stations, airports and at trade fair sites.

What is claimed is:
1. A method for reducing interference in the transmission of an electrical communication signal (x(k)), characterized by the following steps:
  a communication signal, which is received as a faulty function (x(k)), is simultaneously fed to at least one memory (1) and to a plurality of detectors (21 . . . 2n),
  the communication signal (x(k)) is stored in the memory (1) and analyzed in the plurality of detectors (21 . . . 2n) with regard to interference signal characteristics, each of the plurality of detectors being set to detect a particular interference type,
  an interference signal of said particular interference type is recognized by each detector (21 . . . 2n) and then a corresponding time range in which each interference signal occurred is established by a particular circuit block (31 . . . 3n) allocated to each of the plurality of detectors,
  the stored communication signal (x(k)) is read out from the memory (1) and in the time range of the interference signal an interference suppression method is selected and implemented dependent on the particular interference type of interference signal detected by each of the plurality of detectors, wherein the interference signal and the particular interference type recognized are processed so that an interference-free communication signal (y(k+t)) is achieved.
2. The method according to claim 1, wherein the interference suppression method uses an interference blanking (4) of the interference signal and/or an interpolation (5) of the communication signal (x(k)) and/or a subtraction (6) of the interference signal from the faulty communication signal (x(k)) and/or a regeneration (7) of the communication signal (x(k)) after interference blanking (4) is carried out, dependent on the interference signal type.
3. The method according to claim 1, wherein a subtraction of the interference signal is made from the communication signal received as a faulty time function (x(k)) in a case of a steady-state interference signal depending on a degree of correlation between a current interference signal and the interference signal stored in the memory.
4. The method according to claim 1, wherein in a case where the interference signal includes an impulse disturbance being superimposed on the communication signal (x(k)), the interference suppression method uses the impulse disturbance which is blanked out and replaced by a signal created by means of interpolation of the communication signal (x(k)).
5. The method according to claim 1, wherein in a case where the interference signal includes a rumble disturbance superimposed on the communication signal (x(k)), the suppression method uses blanking out, or replacing of a time range of the communication signal (x(k)).
6. The method according to claim 1, wherein the interference signal received (x(k)) is fed to a database in which prototypal representatives of known interference signals are stored and thus by comparing samples of the prototypal representatives of the known interference signal with the interference signal, an interference signal type is reported.

7. The method of claim 1, wherein each of the plurality of detectors (21 . . . 2n) comprises a filter (211 . . . 2n1) which is set to detect a particular interference pattern type by using an interference pattern generator (213 . . . 2n3).

8. The method of claim 1, wherein interference blocking and interpolation are used if interference blanking triggers an error message.

9. The method of claim 7, wherein the filter is a finite impulse response (FIR) filter, and wherein each of the plurality of detectors (21 . . . 2n) further comprises:

a trigger (212 . . . 2n2) responsive to the interference signal, for determining whether the interference signal exceeds a threshold defined for the trigger;

a multiplier element (214 . . . 2n4) for evaluating the interference signal if the interference signal exceeds the threshold; and a delay element (215 . . . 2n5) for setting the interference signal in phase after the interference signal is evaluated by the multiplier element (214 . . . 2n4).

\* \* \* \* \*

UNITED STATES PATENT AND TRADEMARK OFFICE
CERTIFICATE OF CORRECTION

PATENT NO.    : 6,320,918 B1
DATED         : November 20, 2001
INVENTOR(S)   : Walker et al.

It is certified that error appears in the above-identified patent and that said Letters Patent is hereby corrected as shown below:

Title page,
Under References Cited, the last reference cited under "U.S. PATENT DOCUMENTS": please delete "6,131,031" and substitute -- 6,131,013 -- therefor.

Under References Cited, the third reference cited under "FOREIGN PATENT DOCUMENTS": please delete "61-1722" and substitute -- 61-172274 -- therefor.

Signed and Sealed this

Twelfth Day of March, 2002

Attest:

Attesting Officer

JAMES E. ROGAN
Director of the United States Patent and Trademark Office